Patented Feb. 24, 1942

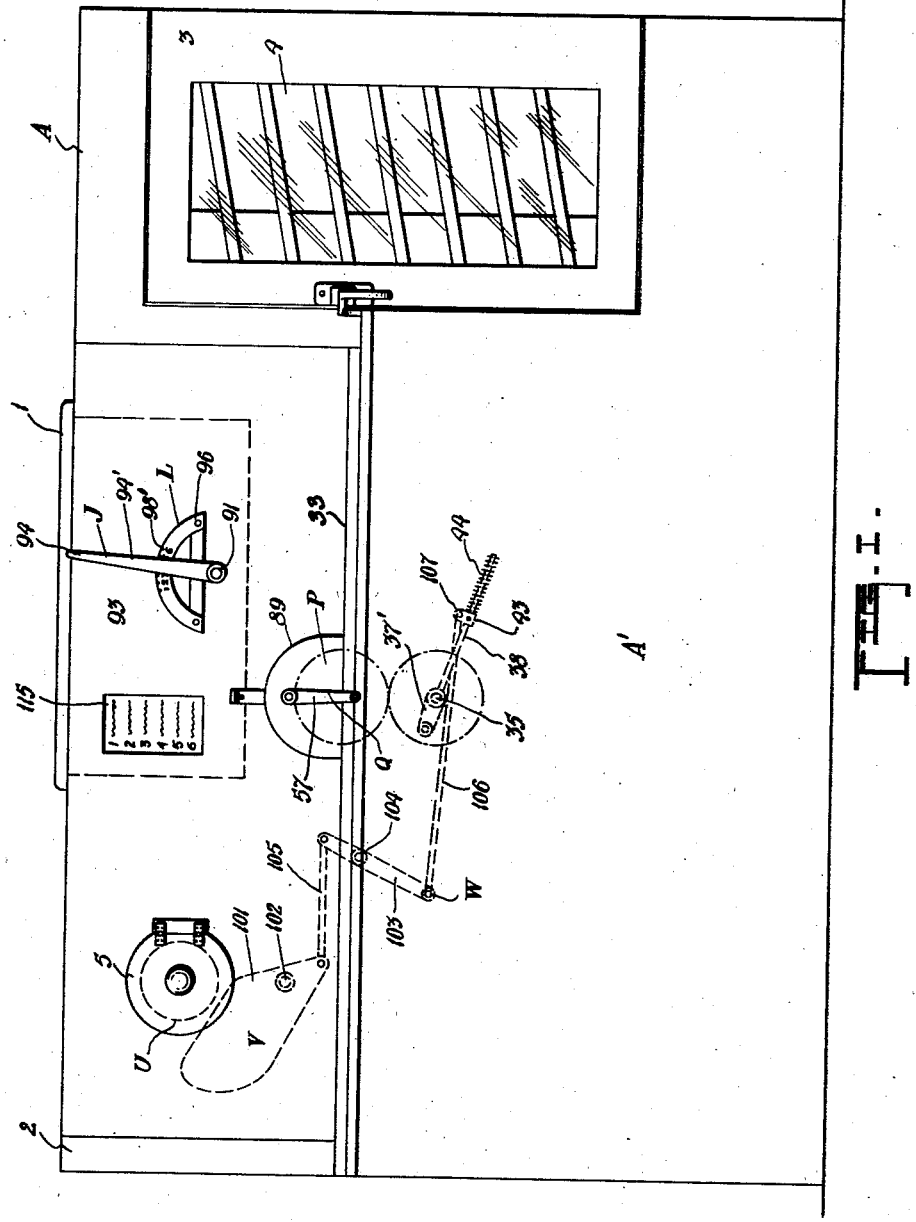

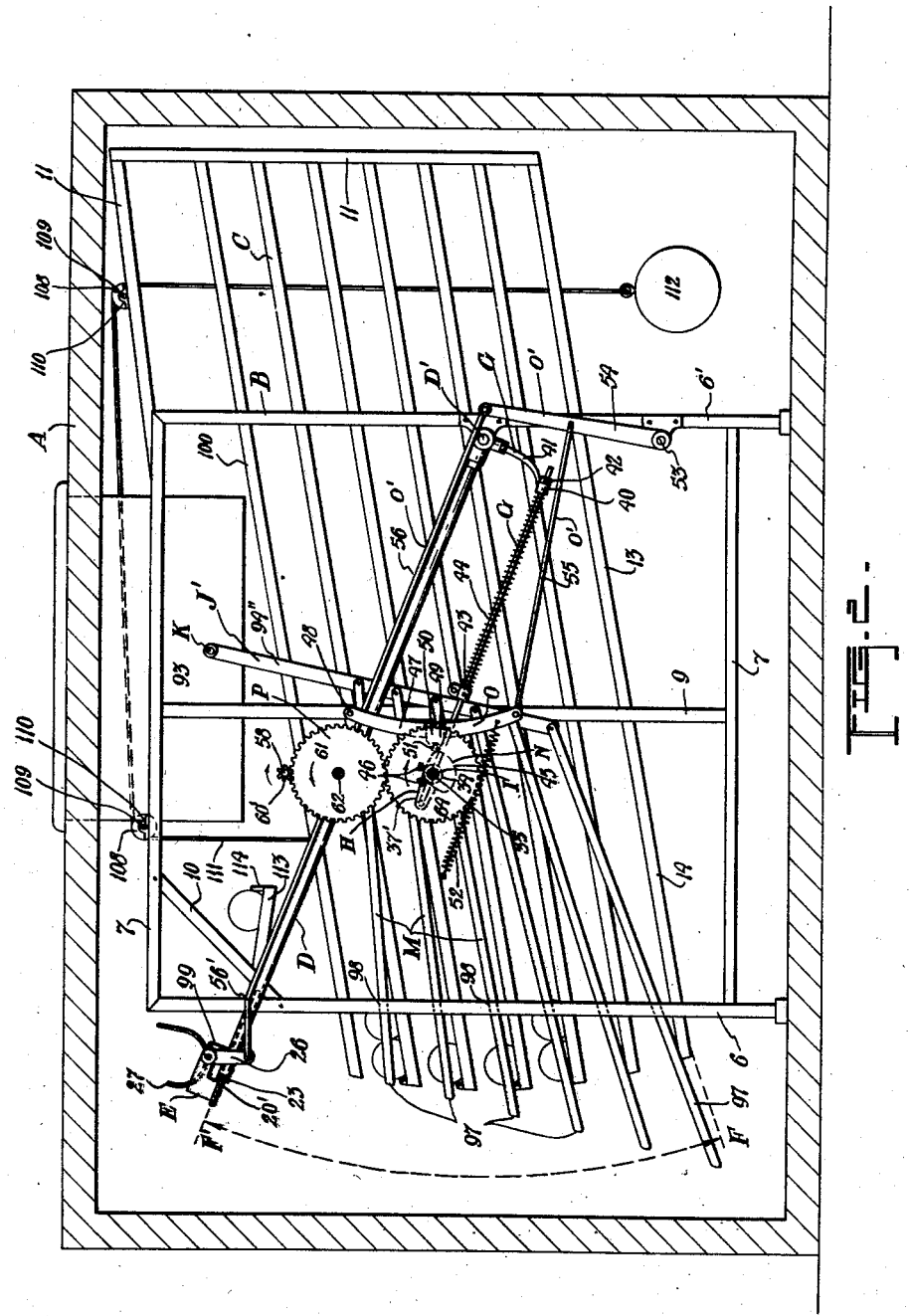

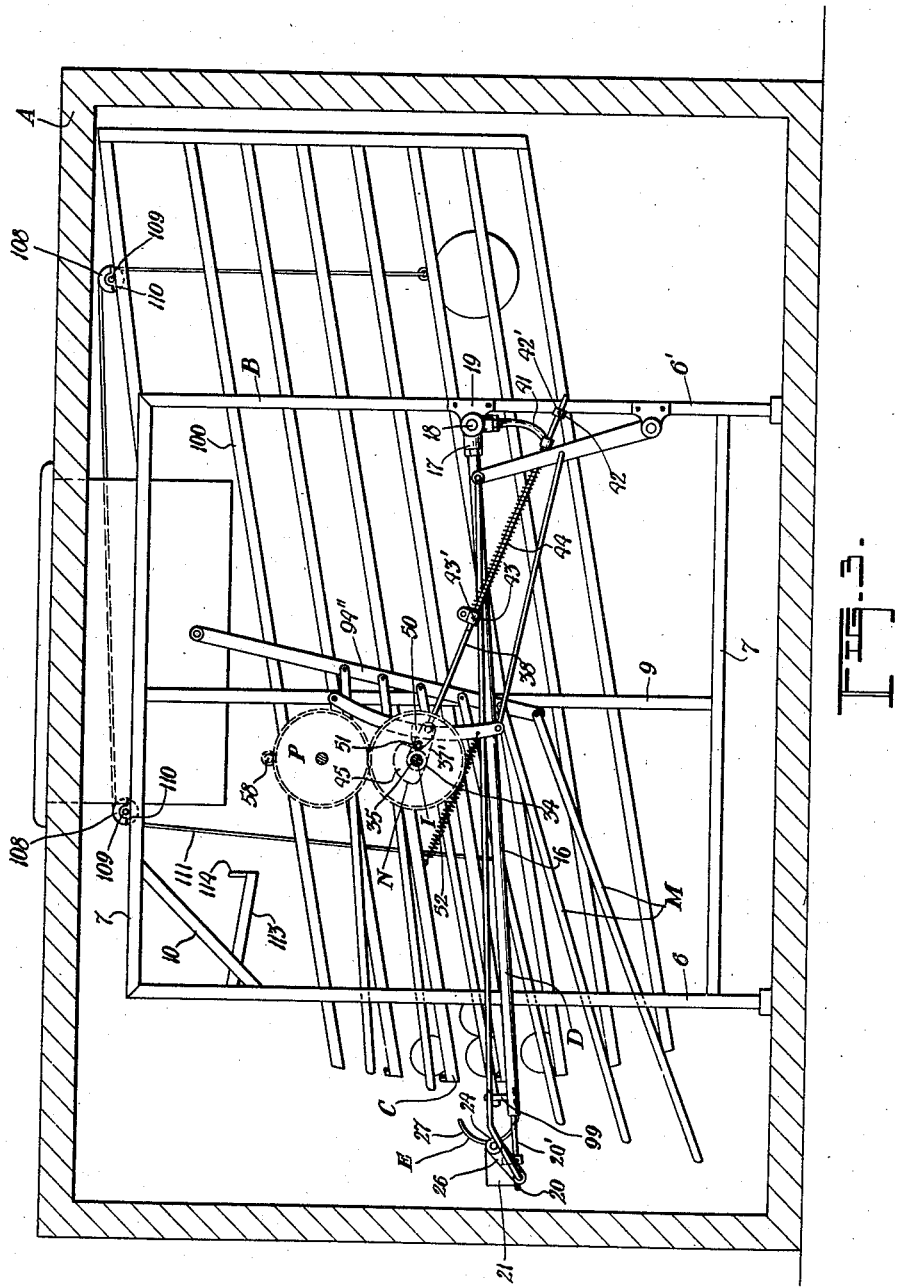

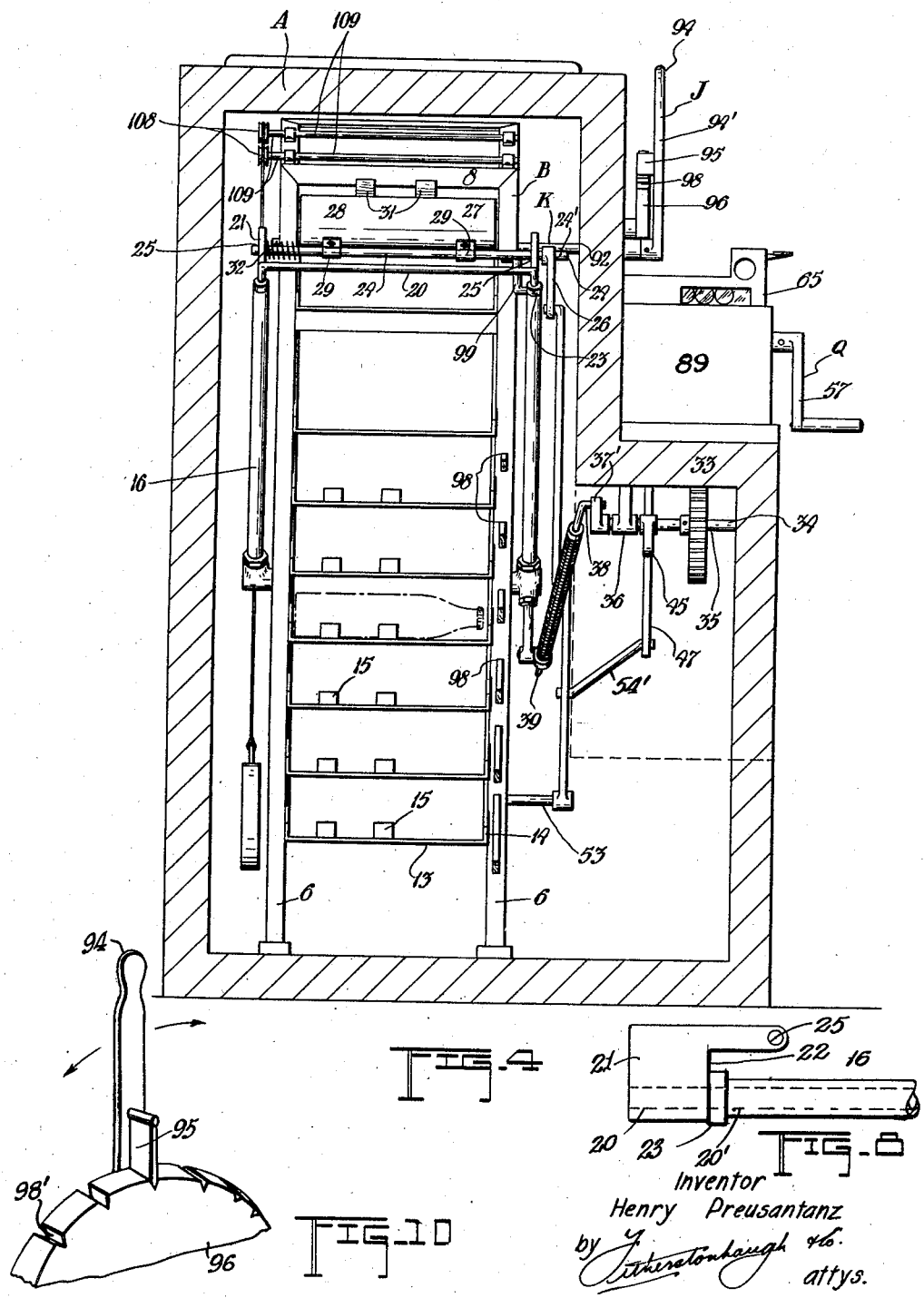

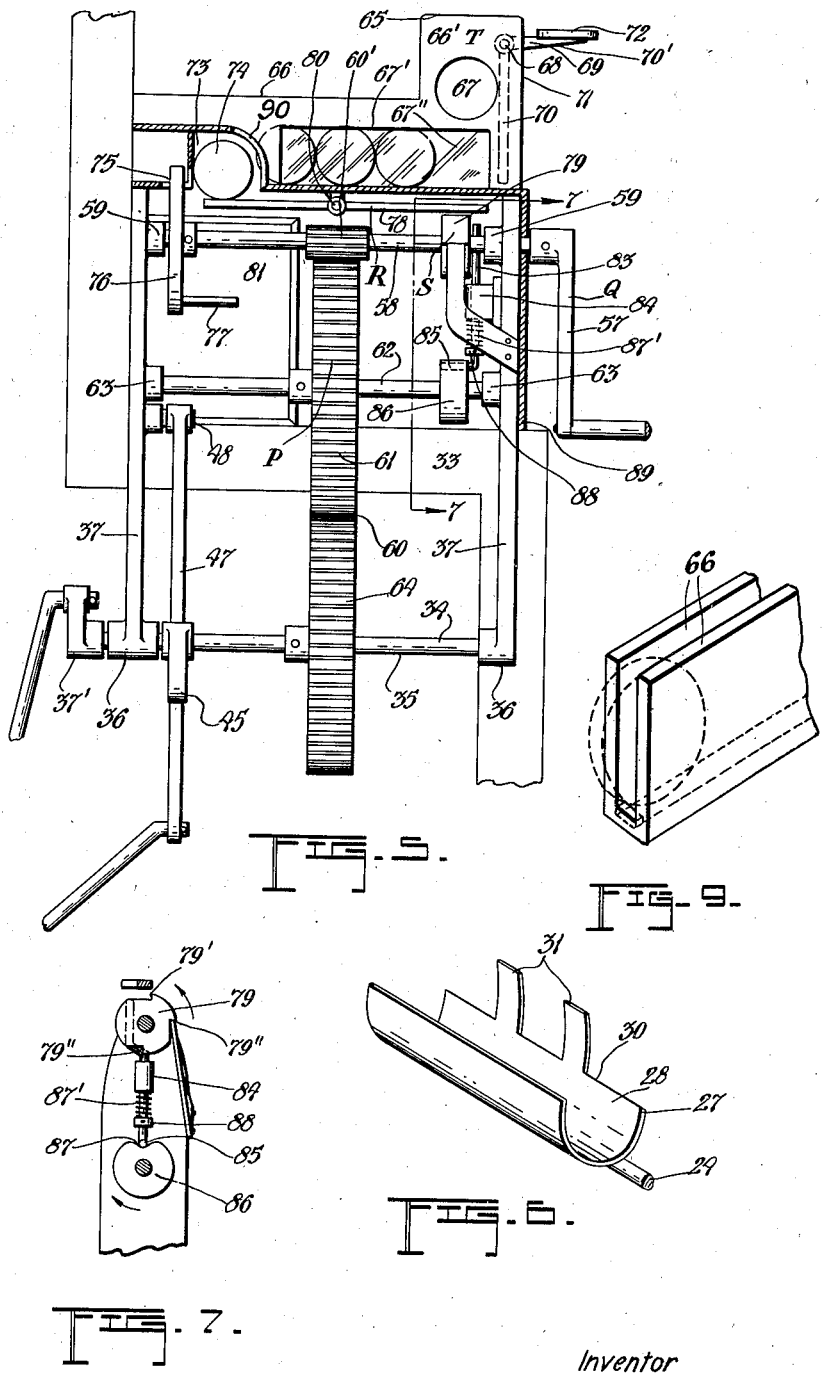

2,274,214

UNITED STATES PATENT OFFICE 2,274,214

COIN-FREED VENDING MACHINE

Henry Preusantanz, Winnipeg, Manitoba, Canada, assignor of two-thirds to Charles James Rawnsley, Albert Hatton Wakefield, and Albert Trueman, all of Winnipeg, Manitoba, Canada, as trustees Application January 24, 1939, Serial No. 252,643

6 Claims. (Cl. 312—45)

My invention relates to improvements in soft drink vending machines, a principal object of my invention being to provide a device of the character herewithin described which may be stocked with a visible supply of bottled soft drinks of a plurality of brands from which a prospective purchaser may make a selection, and, after deposition of a coin in the machine, may be operated by said purchaser to deliver the desired bottled drink.

A further object of my invention is to provide a device of the character herewithin described which is so designed that it is virtually impossible to withdraw more than one bottle therefrom after each operation.

A further object of my invention is to provide a device of the character herewithin described in which the speed of service of a bottled drink is independent of the brand selected.

A further object of my invention is to provide a device of the character herewithin described in which the contents and mechanism thereof are fully protected against improper manipulation upon the part of customers.

A further object of my invention is to provide a device of the character herewithin described in which means are provided for cooling the complete stock of bottled drinks contained therein.

A further object of my invention is to provide a device of the character herewithin described in which the controls thereof are exceptionally simple in operation.

A still further object of my invention is to provide a device of the character herewithin described which is of a sturdy, simplified structure, is economical to manufacture, and is not likely to become out of order.

With the above more important objects in view and such other minor objects as may appear as the specification proceeds, my invention consists essentially in the arrangement and construction of parts all as hereinafter more particularly described, reference being had to the accompanying drawings, in which:

Figure 1 is a front elevation of my invention.

Figure 2 is a vertical sectional view of my invention, illustrating the carrier in position at the upper extremity of its travel.

Figure 3 is a vertical sectional view of my invention, illustrating the carrier in position at one of the trays.

Figure 4 is a sectional end view of my invention.

Figure 5 is a detailed sectional view of my coin freeing mechanism.

Figure 6 is a detailed perspective view of my bucket.

Figure 7 is a detailed view taken along the line 7—7 of Figure 5.

Figure 8 is a side view of my pick-up assembly mounting.

Figure 9 is a perspective detail illustrating the means by which a row of coins is normally held in the coin chute.

Figure 10 is a detail illustrating applicant's selector handle and quadrant.

In the drawings like characters of reference indicate corresponding parts in the different figures.

My invention consists essentially of a refrigerated cabinet A in which a framework B, supporting in this case, six inclined parallel trays C, is positioned. A counterbalanced carrier D is pivoted at the point D' upon the framework B, such that the end thereof upon which is slidably mounted a bottle pick-up assembly E, may travel in an arcuate path F—F', past the lower ends of the trays C. The carrier D is motivated through the resilient linkage G by an arm H upon a shaft I and is so proportioned that one complete revolution of said shaft is sufficient to move the carrier from the delivery position F' to F at the lowest tray and return. Halting the downward movement of the carrier D at any of the intervening trays is permitted by the resilient linkage G.

Each tray bears bottled drinks of one brand only and to select the type of drink to be delivered, I provide a selecting lever J, the arms of which are secured upon opposite ends of a shaft K extending through the front wall of the cabinet, the upper arm J moving over a notched quadrant L outside of the cabinet, and the lower long arm J' having six stop rods M secured pivotally thereto and slidably mounted adjacent said trays C, to project beyond the lower ends thereof. The rods M are of unequal length, and diminish in size from bottom to top, such that by moving the lever J from left to right, first the bottom rod and then successively those above it, are caused to project beyond the lower end of the trays C to stop the carrier D.

Also secured upon the shaft I is a cam N which actuates the pick-up E through the rocker arm O and remaining linkage O'. The pick-up E telescopes inwardly and outwardly upon the end of the carrier D and the cam N is so secured upon the shaft I with relation to the arm H that it causes the pick-up E to assume the position illustrated in Figure 3 of the accompanying drawings immediately the carrier starts its downward movement from position F' and then, when the carrier is stopped adjacent a tray, pulls the pickup inwardly to lift a bottle from the tray and sustain it by assuming the position as illustrated in Figure 2 of the accompanying drawings, in which it is retained while being carried to the delivery position.

The shaft I is motivated through a suitable gear transmission P by a hand crank Q, the gear transmission being normally locked by engagement of one end of the pivoted lever R with a ratchet wheel S. Deposition of a coin through the chute T to push a similar coin onto the opposite end of the lever, has the effect of raising the lever from engagement with the ratchet wheel and permitting a single complete operation of said machine, after which, of course, a bottled drink may be withdrawn from the pick-up E through the aperture U in the cabinet.

Finally, a shutter V is connected through the linkage W with a portion of the resilient linkage G, whereby it is caused to move away from its normal position over the aperture U only when the pick-up assembly E is thereadjacent, thereby precluding the possibility of a person reaching down through the aperture U and taking bottles from the trays when the carrier and pick-up assembly are out of the way.

The foregoing recites the essentials of my invention and I will now proceed to describe the structure and relationship of the parts thereof in greater detail.

The housing for my invention consists of a cabinet A of substantially rectangular configuration but having the lower stepped portion A' thereof of greater width than the upper portion in order to accommodate the mechanism to be placed inside. The cabinet is cooled by a suitable refrigerating unit 1, positioned in the upper portion thereof and is so constructed that the end wall 2 may be easily detached in order to give access to the mechanism within. Also, with more particular reference to Figure 1 of the accompanying drawings, it will be seen that I have provided a hinged door 3, located at the right hand end of the front surface of the cabinet, A, in which a transparent panel 4 is secured, and in the upper left hand of the front surface of said cabinet, I have provided a bottle delivery aperture U, over the outer end of which is hingedly mounted a trap door 5.

Within the cabinet A, it will be seen with more particular reference to Figures 2 and 3 of the accompanying drawings, that I have mounted lengthwise a supporting framework B, which consists of four upright standards 6, 6', positioned in rectangular relationship and secured together at the top and bottom thereof by the longitudinally extending frame members 7 and the laterally extending frame members 8. The framework B is further strengthened by a pair of braces 9, centrally positioned between the standards 6, 6', and extending vertically between the upper and lower frame members 7, and also by a pair of diagonally extending braces 10, which are secured across the upper left hand corner of the framework B between the standards 6 and frame members 7. Positioned lengthwise within the confines of the framework B and secured at the sides thereof to the standards 6, 6', and central braces 9, are, in this case, six inclined, parallel trays C, which with respect to Figures 2 and 3 of the accompanying drawings, extend equally beyond the right hand end of the framework B, to be braced together at the extremity thereof by the braces 11 and 12, and extend a relatively short distance beyond the left hand end of the framework B, such that the lower extremities thereof lie upon the arc of a circle centered at D'. Each of the trays C consists simply of a relatively long metal plate 13 having the sides thereof upturned to form the flanges 14, and is provided with a pair of spaced, upturned lugs 15 formed upon the lower end thereof.

The carrier D which is pivotally mounted upon the framework B comprises a pair of hollow rods 16, which are positioned in parallel, aligned relationship upon opposite sides of the framework B, and are secured at adjacent ends by the elbow couplings 17, to opposite ends of a shaft 18, which is journalled in aligned bearings 19, secured upon the right hand pair of standards 6'.

The pick-up assembly E is mounted upon the opposite free ends of the hollow rods 16 which extend for a short distance past the lower ends of the trays C and consists of a doubly angulated rod 20, extending therebetween and having the end portions 20', thereof slidably positioned in the ends of the rods 16. Upon the end portions 20' of the rod 20 and adjacent the angles formed therein, a pair of laterally aligned brackets 21 are secured and it will be noted that these brackets are provided with recesses 22, formed in the lower, forward portions thereof, which accommodate the stops 23, secured upon the sliding rods 20 and enable these rods to slide inwardly until the forward upper portions of the brackets 21 project a short distance over the ends of the hollow rods 16. A shaft 24 extends rotatably through aligned drill holes 25, formed in the forward portion of the brackets 21, and has secured upon the right hand end thereof with respect to Figure 4 of the accompanying drawings, an arm 26 for a purpose later to be described. A hod 27 consisting of a semi-circular sheet 28 is secured by means of the brackets 29 upon the midportion of the shaft 24, and has formed upon the lip 30 a pair of spaced fingers 31, designed to pass between the lugs 15 upon the end of the tray and to engage with the bottles thereupon. A coil spring 32 is positioned around the opposite end of the shaft 24 from that one which the lever arm 26 is secured and extends between the adjacent edge of the hod 27 and the adjacent bracket 21 such that it imparts a rotative clockwise movement to said hod and shaft when viewed as illustrated in Figures 2 and 3 of the accompanying drawings.

It will be noted that the front surface of the cabinet A of my invention is in this case, stepped to form a horizontal ledge 33 adjacent the midportion of which the mechanism 34 for motivating the carrier D and the pick-up assembly E is most conveniently positioned. This mechanism 34 will be seen to consist essentially of a shaft 35 which is rotatably journalled in a pair of bearings 36 provided upon the lower ends of a pair of upright standards 37 which extend through the ledge 33 and are secured thereto. With more particular respect to Figures 4 and 5 of the accompanying drawings, it will be seen that upon the inner end of the shaft 35, an arm 37' is secured, to the outer end of which is pivotally secured the angled end-piece 38 of a rod 39. The lower end of the rod 39 extends slidably through a collar 40 secured upon the outer end of a relatively short lever arm 41, which in turn is secured in the opposite arm of an adjacent one of the right angled couplings 17 to that in which the carrier rod 16 is secured. A pair of stops consisting of the collars 42 and 43, are secured by means of set-screws 42' and 43' upon the lower end portion and mid-portion respectively of the rod 38, and a coil spring 44 extends about said rod between the collar 40 upon the end of the arm 41, and the collar 43.

The mechanism for actuating the pick-up E in timed relationship with the movements of the carrier D consists essentially of a cam 45 secured upon the shaft 35 by means of the set-screws 46 in a definite relationship to the arm 41. A rocker arm 47 is pivotally mounted at its upper end upon a stub shaft 48 secured upon an adjacent portion of the cabinet A and has secured upon its mid-portion a cam follower 49. Upon the forward end of a stub shaft 53 secured upon the lower portion of the front member of a pair of standards 6', the lower end of a lever 54 is pivotally secured and has a rod link 55 extending between its mid-portion and the lower end of the rocker arm 47. The lever arm 54 is so positioned that its upper end is adjacent the pivotal point D' of the carrier D and between said upper end of the lever arm 54 and the outer end of the arm 26 upon the pick-up E, a relatively long rod link 56 extends, and it will be noted that this rod link 56 is angulated at a point 56' such that a portion thereadjacent will engage with a projecting portion 24' of the shaft 24 when the pick-up E assumes the position illustrated most clearly in Figure 3 of the accompanying drawings and thereby prevents rotation of the hod 27 below the position illustrated.

For rotating the shaft 35, I employ a hand crank 57, which is secured upon the outer, forward end of a shaft 58, which is rotatably journalled in bearings 59 formed integrally upon the upper portion of the standards 37. A gear transmission 60 extends between the shafts 58 and 35 and comprises a pinion 60' of relatively small diameter which engages with a relatively large gear wheel 61. The gear 61 is secured upon the mid-portion of a shaft 62, the ends of which are journalled in bearings 63 formed upon the mid-portion of the standards 37 and engages with a similar gear wheel 64 secured upon the mid-portion of the shaft 35.

A coin freed gear locking mechanism 65 is positioned above the gear transmission 60 and comprises an L shaped, coin receiving chute 66 which is secured at opposite ends thereof upon the upper ends of the standards 37. The chute 66 comprises a pair of spaced side walls 66' and has formed in the upper and outer end portion of one of said walls, a coin admitting aperture 67 and for a short distance along the length thereof a rectangular aperture 67' in which a transparent panel 67" is secured. A pin 68 extends between the side walls 66' at a point adjacent the aperture 67 and has a bell-crank coin feeder generally designated by the numeral 69 pivotally secured thereon. The detail 69 comprises right-angled arms 70 and 70', the former extending downwardly within the chute while the latter projects through an aperture 71 in the front wall of the chute 66 to have a fingerpiece 72 secured upon the end thereof. Operation of this detail is accomplished by pressing down on the fingerpiece 72 which swings the arm counter-clockwise with respect to accompanying Figure 5 and urges the coin along the aperture 67'.

Adjacent the inner end of the chute 66, a section is cut away from the underside thereof to leave an opening 73 of sufficient size to accommodate one of the coins 74, and an adjacent small section is removed to leave an opening 75 to accommodate the upper portion of the wheel 76, which is secured upon the shaft 58 and has a pin 77 projecting perpendicularly from the forward face of said wheel at a point adjacent the perimeter thereof.

Positioned parallel to and immediately beneath the chute 66 is a lever 78 arranged such that its inner end is positioned immediately below the opening 73 to receive a coin thereon, while its outer end projects over a toothed wheel 79 upon the forward portion of the shaft 58, and is fulcrummed intermediate its ends upon the horizontal end portion of an angulated pin 80, secured to the underside of the chute 66, such that its outer end overbalances and normally engages with the notch 79' upon the perimeter of the wheel 79 and prevents rotation of the mechanism. However, when a coin is pushed onto the inner end of the lever 78, the opposite end is raised and the mechanism may be rotated by turning the crank 57, whereupon the pin 77 upon the wheel 76 strikes said coin and knocks it into a coin receiving box 81 positioned thereadjacent. A spring pawl 82 engages with the notches 79" upon the wheel 79 to prevent counter-clockwise rotation of the shaft 58.

Further, to prevent the lever 78 from reengaging with the notch 79' until the cam 45 and arm 37 have been rotated through one complete revolution, a vertically disposed rod 83 is slidably mounted in a guide 84 secured upon the adjacent standard 37 and is angled inwardly at its lower end to form a lug 85. The latter is maintained in continuous contact with the circular track of a cam 86, having a single depression 87 formed therein, by means of a coil spring 87' extending around the rod 83 between the lower portion of the guide 84 and a stop 88 secured upon the rod. The cam 86 is of course, so adjusted that the lug 85 falls into the depression 87 at the completion of the cycle of operation, namely, when the carrier D is in the position illustrated in Figure 2 of the accompanying drawings, and thereby the upper end of the rod 83 which normally supports the outer end of the lever 78 clear of the ratchet wheel 79, is drawn downwardly by the spring 87 to permit engagement of the lever and wheel. Finally, as the upper portion of this gear transmission 60 and coin receiving mechanism projects above the ledge 33 (Figure 1), a removable domed housing 89 is provided, having a slot 90 (Fig. 5) formed in the apex thereof through which may pass coins along the chute 66 onto the lever 78.

My mechanism for selecting the type of bottled drink to be delivered, that is, the tray at which the carrier is to stop in its downward travel, comprises a shaft 91, which extends through a drilled aperture 92, provided in the face of the cabinet A at a point slightly above and to the right of the coin receiving mechanism when viewed as in Figure 1 and is, in this case, rotatably journalled in the side walls 93 of the refrigerating unit. This shaft 91 serves solely as a fulcrum for a lever 94, the relatively short arm 94' of which is secured at its lower end upon the outer end of the shaft 91 and is provided with a leaf-spring pawl 95, secured upon the mid-portion thereof and designed to move over the notched perimeter of a quadrant 96, in which each notch is numbered according to the variety of beverages offered by the machine for a reason which will hereinafter be apparent. The quadrant in turn, is secured upon the face of the cabinet A in concentric relationship with the shaft 91 although any suitable pawl disengaging means of conventional design may be employed to release the pawl 95 from the notches of the quadrant 96 to facilitate movement of the lever 94. The relatively long arm 94" of the lever 94, is positioned within the cabinet adjacent the front side of the framework B and is secured at its upper end upon the shaft 91.

A plurality of stop rods 97 are pivotally secured at adjacent ends thereof at equi-spaced intervals along the lower portion of the length of the lever arm 94" and project slidably at their outer ends through a plurality of slots 98, formed at intervals along a portion of the length of the adjacent member of the standards 6 and project beyond the ends of the trays. The stop rods 97 increase in length from top to bottom and are so positioned, and are of such a length, that each may project beyond the tray adjacent which it is positioned when the lever 94 is set at a predetermined point.

The number of notches 98' positioned upon the perimeter of the quadrant 96 will correspond to the number of trays C and it will be readily seen that when the lever 94 is positioned such that the pawl 95 engages with the notch furthest to the right with respect to Figures 1, 2 and 3 of the accompanying drawings, all of the stop rods will be projecting beyond the lower ends of the trays C such that the projecting end of the uppermost stop rod 97 will engage with the angled projecting lug 99 secured upon the outer end of the adjacent carrier rod 16 and will thereby halt the downward movement of the carrier such that the pick-up E is maintained adjacent the end of the uppermost tray. As the lever is moved from notch to notch to the left, first the uppermost rod 97, then the one below it, and so on, will be drawn inwardly out of the path of the lug 99 upon the carrier D to permit the carrier to move downwardly until it strikes a rod beside the desired tray.

It has been found with the above described mechanism that when the carrier D is positioned somewhat as illustrated in Figure 3 of the accompanying drawings, an unscrupulous party might insert an arm through the aperture U and reach down within the cabinet to seize the bottles upon the uppermost tray. To preclude this possibility, I have provided a dummy protecting tray 100 positioned parallel to and immediately above the uppermost bottle bearing tray and also a shutter assembly V for closing the aperture U except when the pick-up E is positioned thereadjacent. With more particular reference to Figure 1 of the accompanying drawings, this shutter assembly will be seen to consist essentially of a flat shutter 101 of the configuration clearly illustrated, positioned flush with the inside surface of the cabinet A adjacent the aperture U and pivotally secured thereto by the bolt 102. A lever 103 fulcrumed intermediate the ends thereof upon a bolt 104 projecting inwardly from the inner edge of the ledge 33 and positioned intermediate the shutter 101 and the shaft 35, is pivotally joined at its upper end to the lower end of the shutter 101 by rod-links 105, and is similarly pivotally joined at its lower end to the collar 43 upon the rod 38, an upstanding drilled lug 107 being formed integrally with said collar for this purpose. By proper adjustment of this arrangement, the shutter 101 may be caused by movement of the collar 43 upon the rod 38 to move clear of the aperture U only when the carrier is in the position most clearly illustrated in Figure 2, that is, the delivery position.

Although not essential to the operation of my invention, I have found it desirable to counterweigh the carrier D in order to facilitate the ease with which the mechanism may be operated by turning the crank 57. This has been most conveniently attained by providing a pair of aligned pulleys 108 secured upon the rearward end of a pair of shafts 109, each of which is rotatably journalled in a pair of shackle bearings 110 secured upon the upper members 7 and 11 of the framework B. At a convenient point upon the length of the rearmost member of the carrier rod 16, one end of a cord 111 is secured, and said cord extends upwardly over the pulleys 108 and then downwardly to have secured upon its opposite end a counterweight 112. It may also here be noted that in order to preclude the possibility of breakage, should a bottle be dropped from the pick-up E after a customer has forgotten to remove it therefrom, I provide a relatively short inclined emergency tray 113, having the upwardly projecting stops 114 secured to its lower end and being secured at its upper end to the upper portion of the standard 6 at a point adjacent the delivery position of the pick-up E.

The structure and relationship of the various components of my invention having been described, the operation of the whole mechanism will now be explained.

The first step is of course, for the proprietor of the machine to load each of the trays C with one brand only of a bottled soft drink, after which the door 3 may be locked and the machine is ready for customer operation. Presuming now for illustration, that a customer desires to purchase a bottled soft drink of the type that is on the third tray from the top in the machine, this fact having of course, been made known to him by some suitable notice such as 115, placed at a convenient point upon the front of the cabinet A, and indicating by numbers placed against the list of beverages contained on the several trays the corresponding numbered notch 98 into which the lever 94 will have to be moved in order to obtain the required beverage. He will then set the lever 94 in the third notch from the right with respect to Figure 1 of the accompanying drawings, which will have the effect of so positioning the rods 97, that the one adjacent the third tray C will be the first, counting downwardly from the top, which will project beyond the end of the tray.

He will next insert a coin into the aperture 67 and press down upon the fingerpiece 72, thereby pushing a similar coin onto the end of the lever 78, to permit operation of the crank 57. The carrier D will at this point, the beginning of the cycle, be in the position illustrated in Figure 2 of the accompanying drawings, and as the customer now rotates the crank clockwise, the rotation of the arm 37' through the linkage G, will move it downwardly until it strikes the projecting rod adjacent the third tray, during which movement, the cam N through the rocker arm O and linkage O', will push the pick-up E outwardly and rotate the hod 27 until said pick-up and the hod thereof are in the position most clearly illustrated in Figure 3 of the accom- With continued rotation of the crank, the cam N will cause the rod 56, forming a portion of the linkage O', to be pulled inwardly and this force will, due to the spring 32 upon the shaft 24, firstly, draw the pick-up inwardly until the fingers 31 pass between the lugs 15 and under the first bottle upon the end of the third tray, and secondly, rotate the hod 27 to lift said bottle. Further rotation of the crank will in due course rotate the arm 37' to raise the carrier D to its initial position, thus completing the cycle. At this point the lug 85 upon the lower end of the rod 83 falls into the recess provided upon the track of the cam 86 and permits the lever to re-engage with the notch 79' upon the ratcheted wheel 79 to stop further operation of the machine. Also as has already been explained, the motion of the carrier D into the delivery position will have caused the shutter V to move clear of the apertures U. The customer may now open the door 5 and reach into the cabinet and withdraw his drink from the hod 27. In these operations, the importance of the spring 44 should be well noted, for the cam 45 and arm 37' are secured upon the shaft 35 such that they function in properly timed relationship when the carrier is to travel to the lowermost tray and return, and it is this spring 44, which yields and permits the carrier to stop at any of the intervening trays and the cycle of operation to be carried out normally.

Since various modifications can be made in the above invention, and many apparently widely different embodiments of same, made within the scope of the claims without departing from the spirit and scope thereof, it is intended that all matter contained in the accompanying specification shall be interpreted as illustrative only and not in a limiting sense and I desire only such limitations placed thereon as are specifically expressed in the accompanying claims.

What I claim as my invention is:

1. A machine for vending articles of merchandise of various types or brands comprising in combination, a housing cabinet, a framework therewithin, a plurality of trays for containing said articles of merchandise positioned within said housing cabinet, means for delivering one of said articles from one of said trays to an accessible position comprising a carrier pivotally mounted at one end thereof upon said framework, an article receiving pick-up assembly movably mounted upon the opposite end of said carrier adjacent the aligned ends of said trays, a crank arm, a cam, linkage extending between said crank arm and said carrier, linkage extending between said cam and said assembly, mechanism for rotating said crank arm and said cam, whereby said pick-up assembly and said carrier co-act to lift an article from one of said trays and convey the same to said accessible position and customer operated means for selecting the type or brand of article to be delivered comprising a lever capable of setting in a plurality of positions, a plurality of stop rods attached to said lever, each of said rods being positioned adjacent one of said trays and engageable with said carrier when said lever is set in a predetermined position whereby said carrier is temporarily stopped adjacent said tray.

2. The device as defined in claim 1 in which said cabinet is provided with an aperture formed in the front wall thereof, a shutter positioned normally over said aperture, linkage extending between said shutter and a portion of the said linkage extending between said crank arm and said carrier, whereby said shutter is moved clear of said aperture when said pick-up assembly is thereadjacent.

3. A machine for vending articles of merchandise of various types or brands comprising in combination, a housing cabinet, a framework therewithin, a plurality of trays for containing said articles of merchandise positioned within said housing cabinet, means for delivering one of said articles from one of said trays to an accessible position comprising a carrier pivotally mounted at one end thereof upon said framework, an article receiving pick-up assembly comprising a member slidably mounted for limited travel upon the opposite end of said carrier, a rotatable shaft secured upon said member in parallel relationship to the ends of said trays, an article receiving hod secured upon said shaft, bottle engaging fingers upon the lip of said hod, spring means for maintaining said hod normally facing the ends of said trays and maintaining said member at the outer limit of its travel, an arm upon said shaft, a crank arm, a cam, linkage extending between said crank arm and said carrier, linkage extending between said cam and said arm upon said shaft, whereby said pick-up assembly and said carrier co-act to lift an article from one of said trays and convey the same to said accessible position, and customer operated means for selecting the type or brand of article to be delivered.

4. The device as defined in claim 3 in which said pick-up assembly comprises a member slidably mounted for limited travel upon one end of said carrier, a rotatable shaft secured upon said member in parallel relationship to the ends of said trays, an article receiving hod secured upon said shaft, bottle engaging fingers upon the lip of said hod, spring means for maintaining said hod normally facing the ends of said trays and maintaining said member at the outer limit of its travel, an arm upon said shaft, said linkage extending between said cam and said pick-up assembly being connected to said arm, whereby a force exerted upon said linkage against said spring means causes said member to slide inwardly and said hod to rotate upwardly.

5. A machine for vending bottled beverages of various brands comprising in combination, a refrigerated cabinet having a bottle vending aperture formed therein, a framework positioned within said cabinet, a plurality of inclining spaced parallel trays supported by said framework, each of said trays being intended to contain bottled beverages of one brand only, a movable carrier adjacent the lower ends of said trays and a bottle receiving pick-up assembly mounted thereupon, a customer operated mechanism for moving said carrier to lift a bottle from one of said trays by means of said assembly and carry it to a position adjacent said aperture, and customer controlled means for stopping said carrier at a given tray and lifting a bottle from said given tray.

6. A machine for vending articles of merchandise of various types or brands comprising in combination, a housing cabinet, a framework therewithin, a plurality of trays for containing said articles of merchandise positioned within said cabinet, means for delivering one of said articles from one end of each of said trays to an accessible position and a customer operated means for selecting the type or brand of article to be delivered, said first mentioned means comprising a carrier pivotally mounted at one end thereof upon said framework, an article receiving pick-up assembly movably mounted upon the opposite end of said carrier adjacent the delivering ends of said trays, a crank arm, a cam, linkage extending between said crank arm and said carrier, linkage extending between said cam and said assembly, mechanism for rotating said crank arm and said cam, whereby said pick-up assembly and said carrier will co-act to lift an article from one of said trays and convey the same to said accessible position.

HENRY PREUSANTANZ.